(No Model.)

G. E. ADAMS.
CUFF HOLDER.

No. 357,167. Patented Feb. 8, 1887.

FIG. 1½.

WITNESSES,
Mary C. Hussey
Alfred A. Hill

INVENTOR
George E. Adams
By Walter B. Vincent Atty.

UNITED STATES PATENT OFFICE.

GEORGE E. ADAMS, OF PROVIDENCE, RHODE ISLAND.

CUFF-HOLDER.

SPECIFICATION forming part of Letters Patent No. 357,167, dated February 8, 1887.

Application filed October 25, 1886. Serial No. 217,122. (No model.)

*To all whom it may concern:*

Be it known that I, GEORGE E. ADAMS, of Providence, in the State of Rhode Island, have invented a new and useful Cuff-Holder; and I do hereby declare that the following specification, taken in connection with the drawings making a part of the same, is a full, clear, and exact description thereof.

Figure 1:
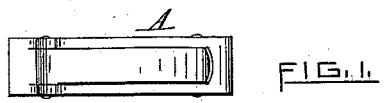
Figure 2:
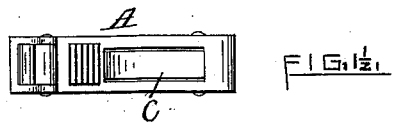
Figure 2:
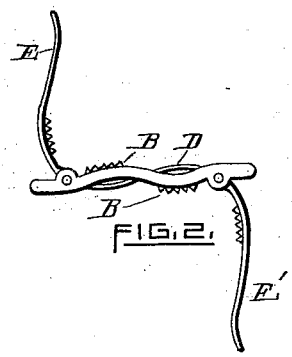
Figure 3:
Figure 4:

Figure 1 is a front or top view of my device with arms closed. Fig. 1½ is a view of same with arm removed. Fig. 2 is a side view with arms open. Fig. 3 is a side view with arms closed. Fig. 4 is a view of the arm detached.

The object of my invention is to produce a device with which the cuff can be readily and quickly attached to and removed from the shirt; and it consists in the construction, arrangement, and operation of the locking-arms, as hereinafter described.

In the drawings, A is the frame of the device, which is made somewhat irregular in shape to give prominence to the milled or corrugated surfaces B B. The frame A is also provided with a central slot, C, through which passes a spring, D, common to both arms, which spring is held by the turned-over ends of the frame.

E E' are locking-arms attached to opposite sides of the frame and working upon pivots secured thereto, and having cam-shaped ends $a$, resting upon and in contact with the spring D.

The arms E E' and the corresponding parts of the frame A are provided with milled surfaces, the better to retain any intervening substance.

Taking the device with the arms open, as shown in Fig. 2, the arm E' is inserted in the button-hole of the wristband and locked by being pressed inward toward the frame A, as shown in Fig. 3. This inward pressure overcomes the resistance of the spring D and allows the cam-shaped end of the arm to turn and present another surface to the spring, as shown in Fig. 3, when it will be held in a horizontal position, as will be readily understood. The cuff-holder being now attached to the shirt, the arm E is next passed through the button-holes of the cuff and is locked in the same manner as shown in Fig. 3.

Whenever it is desired to remove the cuff, the arm E may be raised, the cuff removed, and the arm again locked, leaving the cuff-holder attached to the shirt.

What I claim as my invention, and desire to secure by Letters Patent, is—

A cuff-holder having two locking-arms, E E', in combination with a frame, A, and spring D, the whole constructed and operating in the manner substantially as described.

GEORGE E. ADAMS.

Witnesses:
 WALTER B. VINCENT,
 ALFRED I. HILL.